No. 877,034. PATENTED JAN. 21, 1908.
H. ANSCHÜTZ-KAEMPFE.
GYROSCOPE.
APPLICATION FILED JUNE 6, 1906.

3 SHEETS—SHEET 1.

Witnesses:
H. Fleischer,
John O. Seifert.

Inventor:
Hermann Anschütz-Kaempfe.
By his Attorney,
F. H. Richards.

No. 877,034. PATENTED JAN. 21, 1908.
H. ANSCHÜTZ-KAEMPFE.
GYROSCOPE.
APPLICATION FILED JUNE 6, 1906.

3 SHEETS—SHEET 3.

Witnesses:
H. Fleischer
John C. Seifert

Inventor:
Hermann Anschütz-Kaempfe.
By his Attorney,
F. H. Richards.

UNITED STATES PATENT OFFICE.

HERMANN ANSCHÜTZ-KAEMPFE, OF KIEL, GERMANY.

GYROSCOPE.

No. 877,034.

Specification of Letters Patent.

Patented Jan. 21, 1908.

Application filed June 6, 1906. Serial No. 320,398.

*To all whom it may concern:*

Be it known that I, HERMANN ANSCHÜTZ-KAEMPFE, doctor of philosophy, a subject of the Empire of Germany, residing in Kiel, in the Kingdom of Prussia, Germany, have invented certain new and useful Improvements in Gyroscopes, of which the following is a specification.

It is well known that an ordinary rotating gyroscope stands still in space and thus has a motion relatively to the earth. The apparent movement of the axis of the gyroscope is, however, greater or smaller according to the latitude, that is to say, on the pole the movement of the gyroscope will be the largest, that is to say, 360° in 24 hours, and on the equator the smallest, that is to say, 0° per day, relatively to the movement of the earth. The movement of the axis of the gyroscope in each latitude corresponds to the sine of that latitude.

In order to obtain a gyroscope which could be used, for instance, for navigating a ship at any point of the earth, that is to say, a gyroscope, the axis of rotation of which would indicate direction for steering a ship, it is necessary to do away with the apparent movement of the axis of rotation in accordance with the latitude, that is to say, to give the axis of rotation such a movement that the said axis should appear to be standing still at any point of the surface of the earth.

The present invention relates to a gyroscope in which a control complying with the above condition, is rendered possible.

The invention also relates to a device by means of which the position of the axis of rotation of the gyroscope can be automatically corrected from time to time, after it has become inclined to a certain extent.

A construction of the invention is shown by way of example in the accompanying drawings; of which:—

Figure 1:
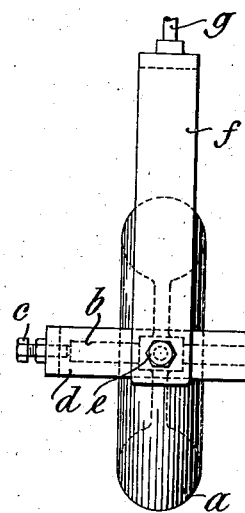
Figure 2:
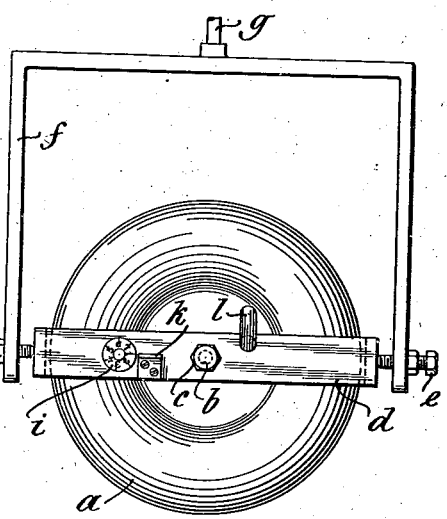
Figure 3:
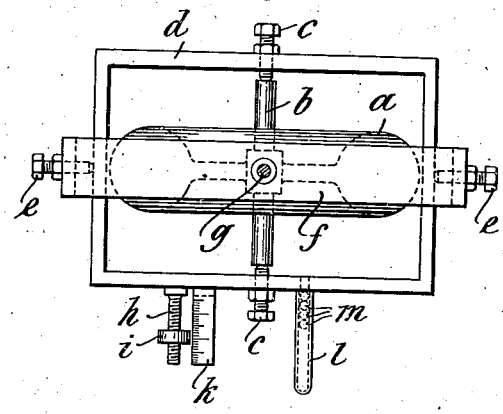
Figure 4:
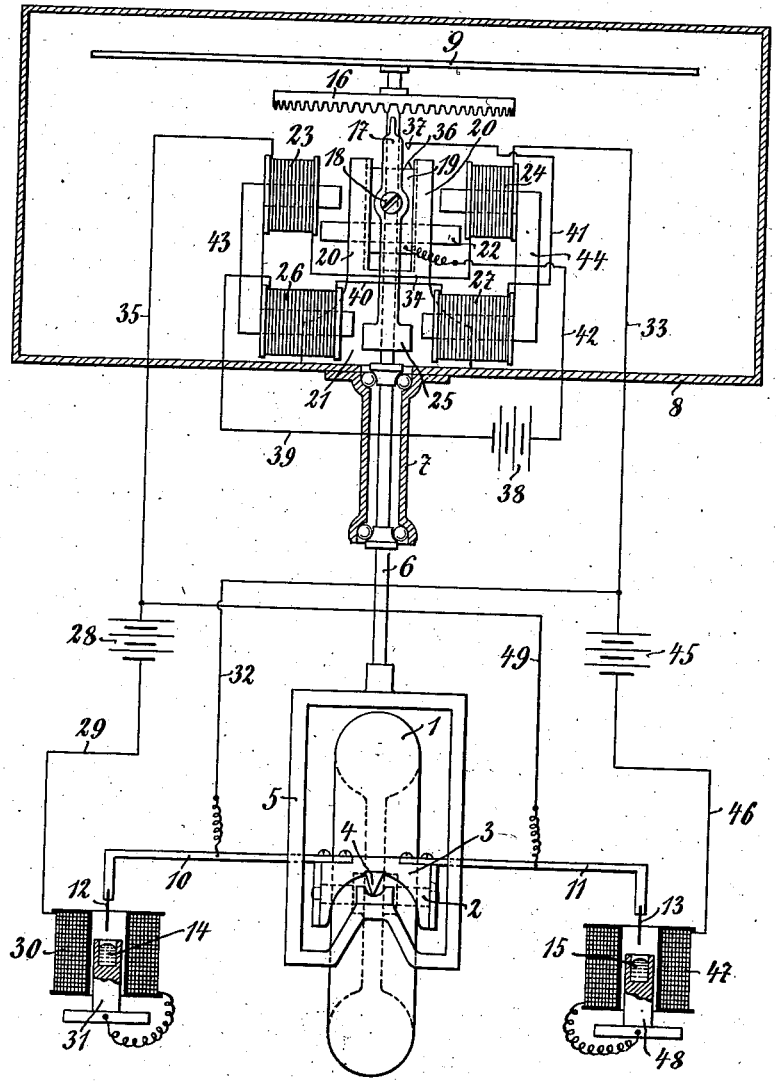
Figure 5:
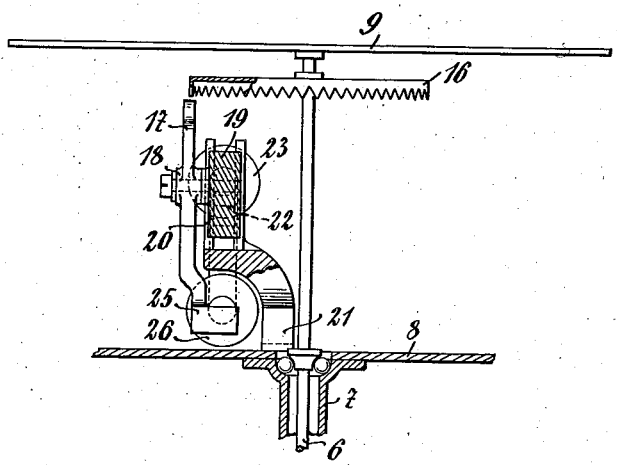
Figure 6:
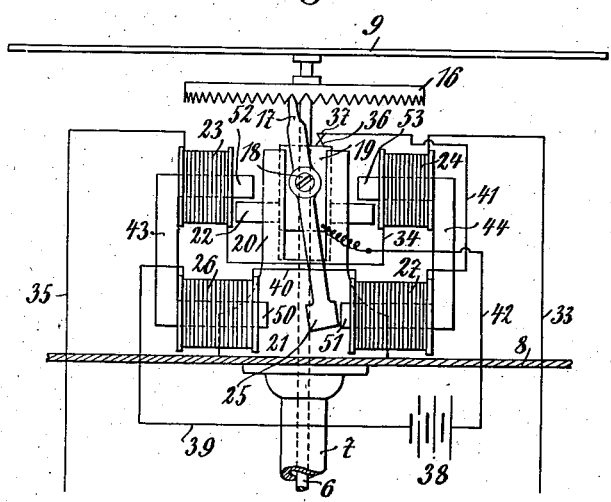

Figure 1 is a side elevation, Fig. 2 a front elevation, and Fig. 3 a plan of a gyroscope arranged in such manner that the apparent movement of the axis of the gyroscope is neutralized in accordance with the latitude; and Figs. 4, 5 and 6 are a general view and details of a device by means of which the position of the axis of rotation of the gyroscope can be automatically corrected from time to time.

The invention is based on the well known fact that a gyroscope movable about three axes at a right angle to each other and which is in equilibrium, can be given any desired speed about the vertical axis, that is to say, any desired precession, by disturbing its equilibrium in horizontal position by means of any desired force, for instance, by a pull, pressure, putting on a weight, magnetic attraction, etc.

According to this invention a gyroscope is rendered suitable for the purpose of navigating a ship or for similar purposes, by putting on one side of the axis of rotation a weight (the action of which properly selected as to amount or position is suited to the latitude in which it happens to be), in such manner that the precession produced by the weight will always correspond to the speed of rotation of the earth at the point in question and will have the same direction, that is to say, there will be no relative movement between the gyroscope and the surface of the earth. The required size of the weight, or its position relative to the point of suspension of the gyroscope which, apart from the latitude, depend also on the mass, speed of rotation, and so on, of the gyroscope, can be found empirically or by calculation.

In carrying out the invention it is preferred to employ a device in which the position only but not the amount of the weight, has to be altered. This device is arranged in such manner that a weight which has been found, empirically or by calculation, to be suitable for obtaining the desired precession at any one point of the surface of the earth, is adjustably arranged on the gyroscope, in such manner that by moving it in one or in the other direction, the precession produced corresponds to the speed of rotation of the earth at any latitude. Moreover, the gyroscope is provided with a scale having divisions, which enables the position of the weight to be read. The divisions of the scale indicate the various degrees of latitude, requiring the various positions of the weight. As will be readily understood, the weight on the equator must coincide with the point of suspension of the gyroscope, that is to say, to exercise the influence O, on the pole, however, it must occupy the outermost position, that is to say, have the largest leverage. Such a device does not, however, act theoretically in a perfect way, but have certain errors inherent to it, chiefly due to friction taking place when the gyroscope moves about its various axes of rotation. These errors may be taken into consideration in calculation. The invention relates, however, to a device for rendering the indications of the apparatus free from such errors.

For explaining the device, let the influences of the friction of the spindles be considered in a fuller manner. If it were possible to reduce the friction of all the three spindles to zero, then, when adjusting the weight in accordance with the latitude, the axis of the gyroscope would always make the precession corresponding to the said latitude, that is to say, the axis would always participate in the rotation of the earth and thus appear to be standing still. It is, however, mechanically impossible so to suspend a gyroscope as to have no friction. A small force component, due to the friction, will therefore always act in opposition to the force acting on a point outside the center of gravity and having the tendency to give the gyroscope the precession, the said small force due to friction having the tendency to put the gyroscope into its new center-of-gravity position, at the expense of the precession movement. After a certain time, the gyroscope would therefore find a new center-of gravity position and then would no longer participate in the movement of the earth, since it no longer has any precession, and therefore would be unsuitable for the purpose of navigation.

In order to avoid the difficulty in question, the weight is arranged in such manner that the axis of the gyroscope, during the slow non-periodic swinging back into its center-of-gravity-position, receives an increased pressure in accordance with its change of position, in such manner that the movement of precession always remains the same, and the axis of the gyroscope remains in position of relative rest. The weight is therefore made in such way that, according to the extent of the turning of the gyroscope about its horizontal axis, which is the balanced position, it moves away from the center of rotation of the balance to such an extent that the pull always remains the same, and therefore the precession movement also remains always the same. This result is obtained, for instance, by arranging the weight in question in the shape of a quantity of liquid, of a ball inclosed in a slightly bent pipe, and the like. At the least inclination of the balance axis of the gyroscope, the weight will swing or flow or roll further outwards, and the pull on the axis will be increased in accordance with the greater leverage, so that the said pull will produce the same precession impulse even in the new balanced position of the apparatus. The weight of the liquid as well as the length, and curvature of the pipe, can be easily determined empirically.

Figs. 1 to 3 of the accompanying drawings illustrate a gyroscope according to this invention. The fly wheel $a$ of the gyroscope is suspended in the well known manner, so that it can move about three axes at right angles to each other. To that end, the spindle $b$ about which the fly wheel rotates, is supported by means of screws $c$ in a frame $d$ which, in its turn, can rotate about the bearing screws $e$. These latter are secured to the frame $f$ which is rotatable about the vertical spindle $g$. The frame $d$ is provided with a laterally projecting screw bolt $h$ on which travels a nut $i$ acting as a weight. The nut $i$ is provided with a division into degrees, and adjacent thereto is arranged a scale $k$ secured to the frame $d$. The scale and the divisions make it possible to set the nut in an exact position, in accordance with definite indications, given either in a corresponding table or marked on the scale and on the divisions themselves. By setting the nut in different positions, precession suited to various latitudes is produced. In order to allow for the frictional resistances the frame $d$ is provided, in addition to the adjustable weight, with a pipe $l$ slightly bent upwards, in which weight balls $m$ are free to roll. When the elevation spindle becomes inclined, the balls in question roll slightly outwards, the leverage of the weight thus being increased, so that the precession remains the same in the new balanced position.

Such a gyroscope would theoretically participate exactly in all movements of the earth in any latitude and therefore would be suitable for navigation purposes. In practice, however, after a certain time which may be longer or shorter, in accordance with the kinetic momentum of the gyroscope, it would become inclined to such an extent that its axis of balance would become perpendicular to the horizontal, and then its stability would disappear and it would become useless. Its use would, therefore, be limited to a certain period of time, longer or shorter according to circumstances. In order to neutralize this time limit of utility, the device illustrated in Figs. 4—6 is used. As already stated, it is based on the fact that the position of the axis of rotation is periodically corrected. For making the correction, it is preferable to choose the moment at which the axis of rotation has moved out of its position to a given small extent which, in itself, does not constitute a perceptible source of errors. Periodical correction of the position of the axis is effected in accordance with this invention on the basis of the well known gyroscope laws, by closing the circuit of an electromagnetic driving device as soon as the axis of rotation has moved out of its original position to a given extent, (say for example 5°). As soon as the circuit is closed, the driving device in question exercises a torque on the axis which is perpendicular both to the axis of rotation and to the axis about which the inclination has taken place. As is well known from physical laws of the gyroscope, owing to this torque and to a reaction, a movement of the axis of rotation is brought about. In Figs. 4, 5 and 6 of the accompanying drawings, is illustrated a device or apparatus embodying this portion of the invention of which, Fig. 4 illustrates a complete apparatus, Figs. 5 and 6 being detail views of the apparatus by means of which the torque is exerted on the vertical axis. This apparatus is shown in Fig. 5 in side elevation, and in Fig. 6 in front elevation that is to say in the same view as in Fig. 4, but in the position, in which it is immediately after it has been operated.

The fly wheel or disk 1 of the gyroscope is rotatably mounted about the axis or spindle 2 and by means of the latter in a frame 3. Frame 3 rests by means of two knife edges 4, which can oscillate about an axis perpendicular to the plane of the paper, on a frame 5 which is secured to a vertical rotatable spindle 6. The spindle 6 is rotatably suspended by means of ball bearings 7, in a casing 8 and carries at its upper end (as the construction under consideration is a gyroscope intended to supplement or to replace ship's compasses) a dial 9.

To the frame 3 are secured two arms 10 and 11. If the spindle 2 of the fly wheel or disk assumes an inclined position relatively to its normal position, which in the present example is assumed to be horizontal, but, as is well known, may be in any desired plane, according to the construction of the gyroscope, the arms 10 and 11 will participate in the said inclination. In other words the axis of rotation 2 with the fly wheel or disk 1, the frame 3 and the arms 10 and 11 form a double-armed lever which is rotatable about the knife edges 4. The problem is as soon as the said lever has moved to a certain given extent, for instance 5°, out of its normal, (in this case its horizontal) position, to apply a force which will again bring the lever into its normal position in the manner hereinbefore described. To this end the arms 10 and 11, which are assumed to be made of metal, are provided with two contact pins 12 and 13, which dip into a mercury cup 14 or 15, as soon as the frame 3 has inclined to an extent previously determined. In this way, according as the inclination takes place in one or in the other direction, a circuit is closed either between the contact pin 12 and the mercury cup 14, or between the contact pin 13 and the mercury cup 15, and then, as will be hereinafter described, an action is produced, by means of which the system of levers 3, 10, 11, that is to say, the axis of rotation 2, is righted. This action, as already stated, is brought about in such manner that a torque is exerted on the vertical spindle 6. To that end a ratchet wheel 16 is mounted on the said spindle. The electro magnet device which effects the correction, is provided with a pawl 17 arranged in such manner that, when the correction is to be made, the said pawl is brought into engagement with the ratchet wheel 16 and then tries to turn the said wheel in one of the two directions. In this way, a torque is exercised on the spindle 6 which, in accordance with the well known gyration laws, results in the elevation of the axis 2 of rotation, or of the frame 3 about the axis represented by the knives 4.

The relative position of the ratchet wheel 16 and of its pawl 17 in their position of rest will be clearly seen in Fig. 5. Fig. 6 shows the pawl in engagement with the ratchet wheel, in the position in which the two parts are placed when the ratchet wheel is to be advanced to the extent of one tooth.

The pawl 17 is rotatably mounted by means of a spindle 18 on a slide block 19 which is vertically adjustable in guides 20 of a frame 21. The pawl with accessories is supported in the casing 8 by means of the frame 21.

To the slide block 19 is secured an iron bar 22 which constitutes an armature for the electromagnets 23 and 24. When these electromagnets are excited and attract the armature 22, the latter is raised, and with it the slide block 19 is raised in its guides, and the pawl 17 is brought into engagement with the teeth of the ratchet wheel 16.

The bottom end of the pawl 17 is provided with an armature 25 for the electromagnets 26 and 27. When the latter are excited a pull is exercised on the armature 25 in one or in the other direction, owing to which the pawl 17 exercises on the ratchet wheel 16, in one or in the other direction, the turning movement that was to be produced, as has been explained.

The working of the device is as follows:— When the axis of rotation of the system of levers 3, 10, 11, descends, for instance on the left hand side, to a certain extent, the contact pin 12 comes in contact with the surface of the mercury in the cup 14, and closes a circuit leading from the positive pole of the battery 28, through the conductor 29, to an electromagnet coil 30, the object of which will be hereinafter described, from the latter to the core 31 carrying the mercury cup, thence through the contact pin 12, arm 10, conductor 32 and conductor 33 to the electromagnet 24, then through the conductor 34 to the electromagnet 23, and through the conductor 35 back to the battery 28. In this way the electromagnets 23 and 24 are excited, the armature 22 attracted, the slide block 19 raised and the pawl 17 brought into engagement with the teeth of the ratchet wheel 16. If the axis of rotation 2 inclines towards the right and thus a contact takes place between 13 and 15 instead of 12 and 14, the circuit not of the battery 28, but of another battery 45 will be closed. This latter circuit goes from the positive pole of the battery through the conductor 46, coils 47, core 48, mercury cup 15, contact pins 13, arm 11, conductor 49, conductor 35, electromagnet 24 and conductor 33 to the negative pole of the battery 45. It must be pointed out that in that case the electromagnets 23 and 24 have the current passing through them in the opposite direction to that flowing when the circuit is closed between 12 and 14. The polarity of the said electromagnet will, therefore, be an opposite one to that of the preceding case. The cores of the electromagnets as well as the armature 22, are made, however, of soft iron, so that the armature will always be attracted, whatever be the polarity.

The slide block 19 carries a contact 36, which, as soon as the slide block is raised, touches a contact 37, and thus closes the circuit of a battery 38 in which circuit are placed the windings of the magnets 26 and 27, the said circuit going from the positive pole of the battery through the conductor 39 to the electromagnet 26, through the conductor 40 to the electromagnet 27, through the conductor 41 to the contact 37 and from the latter through the contact 36 and slide block 19 to the conductor 42, which is connected to the negative pole of the battery 38.

The arrangement must be such, that by the action of the electromagnets 26 and 27 on the armature 25, such a torque should be exercised on the wheel 16, that is on the spindle 6, that the reaction movement produced by it should correct the position of the axis of rotation 2, that is to say, should cause it to move to the right, when the circuit is closed on the left hand side, and vice versa. In the construction above described, this is effected in the following manner:—The electromagnet coils 23 and 26 are mounted on a common core 43, and the electromagnet coils 24 and 27 on a common core 44, both cores being made of soft iron. The windings 26 and 27 are arranged in such manner, that the two ends 50 and 51 (Fig. 6) of the cores 43 or 44 respectively facing the armature 25, receive the same polarity, and the said poles will always be the same, and according to the circumstances either N or S poles, independently of the apparatus being rendered operative by the closing of the circuit at the contact pin 12 or at the contact pin 13. The electromagnets 23 and 24 are, on the contrary, wound in such manner, that, for instance, when the current is closed by the pin 12, the end 52 of the core 43 facing the armature 20 is given a polarity N, and the end 53 of the core 44 facing the armature 20, is given a polarity S.

It will be seen from the above, that the polarity of the poles 50, 51, produced by the windings 26 and 27, is increased at one pole by the simultaneous exciting of the cores 43, 44 by the coils 23 and 24, and weakened at the other, so that the armature 25 is always moved to one or to the other side, according as the circuits have been closed at the pin 12 or at the pin 13.

The working of the apparatus will now be readily understood, let it be assumed that when the coils 26 and 27 are excited, the poles 50, 51 always obtain N magnetism. Let it be further assumed that when the axis of rotation is inclined towards the left (Fig. 4) so that the pin 12 dips into the mercury cup 14, the ratchet wheel 16 or the spindle 6 has to be turned towards the left, in order to obtain the desired elevation. The winding of the coils 23 and 24 must then be arranged in such manner, that they should excite N magnetism at the pole 52 and S magnetism at the pole 53. Then the N magnetism of the pole 50, produced by the coil 26, will be weakened by the S magnetism influenced by the N pole 52 of the core 43, but the N pole 51, excited by the coil 27 will be strengthened by the magnetism at the S pole 53, and therefore the armature will be attracted by the pole 51, and thus the crown wheel 16 will be given the desired rotation towards the left (Fig. 6). When the circuit is closed by the pin 13, instead of the pin 12, the opposite process takes place.

It remains now to explain the object of the coils 30 and 47 which surround the cores 31 and 48 carrying the mercury cups 13 and 14.

The action of the device must be such, that when the axis of rotation is lowered to a certain extent, the reaction should start at once and continue until the axis of rotation has again been brought into its original position. Up to that moment the pull on the electromagnet armature 25 must act in one of the two directions. The problem is, accordingly to close the circuit of the electromagnets 23, 24 at that moment, in which the axis of rotation has been lowered to a certain extent, and to keep the said circuit closed until the axis of rotation has been moved back again to exactly the same extent. To that end, the mercury cups 14 and 15 are not fixed, but are mounted on the electromagnet cores 31 and 48, which are raised when the corresponding coils 30 and 47 are excited, and remain in the raised position as long as there is any current in the coils. The raising of the cores takes place to exactly the same amount, to which the pins 12 and 13 must have been lowered before the correcting movement was started.

The coils 30 and 47 are inserted into the circuit of the electromagnets 23 or 24. If, therefore, one of these circuits, owing to the contact pin 12 or contact pin 13 coming in contact with the surface of the mercury, is closed, then, apart from the just described action of the electromagnet in driving device for producing a torque on the vertical spindle 6, the coil 30 or 47 will be excited, and the corresponding core raised to such an extent, that the contact pin will dip into the mercury to the same extent to which it had formerly been lowered, in order to reach the surface of the mercury and thus to close the circuit.

When the reaction movement begins and therefore the contact pin 12 or 13 begins to rise, it remains at first in contact with the mercury, so that the circuit is maintained closed, and the reaction continues until the contact pin is moved to the same extent to which it had before been lowered. Not until the moment at which the return movement of the axis of rotation has thus been completed, will the circuit be interrupted, so that the reaction ceases, and the axis of rotation remains in position.

It is evident that the electromagnetic driving device with the pawl 17 might be modified in various ways, and also the switching by means of which the electromagnets are excited, could be arranged if desired in different ways. The arrangement of the circuit closing device with the coils 30 and 47 and the movable cores carrying mercury cups, could also be modified in various ways.

What I claim as my invention, and desire to secure by Letters Patent, is:—

1. In a device for maintaining the axis of rotation of a gyroscope at its normal position, the combination with a gyroscope-wheel and means for supporting this upon its axis of rotation and upon two axes transverse thereto and to each other, of means for applying a torque tending to turn the said wheel upon one of the said two axes, and means controlled by said wheel in its turning on said axis for applying a torque tending to turn the wheel on the other of said two axes.

2. In a device for maintaining the axis of rotation of a gyroscope at its normal position, the combination with a gyroscope-wheel and means for supporting this upon its axis of rotation and upon two axes transverse thereto and to each other substantially horizontal and vertical respectively, of means for applying a torque to said wheel upon one of the said two axes, and means controlled by said wheel in its movement about its horizontal axis from its normal plane of rotation for applying a torque tending to turn it upon its vertical axis from its normal plane of rotation for returning it to its normal plane of rotation by turning on its horizontal axis.

3. In a gyroscope, the combination with a gyroscope-wheel and a spindle therefor, of means for supporting the spindle and permitting said spindle and wheel to turn about a horizontal and about a vertical axis, both of said axes being transverse to the axis of rotation of the wheel on its spindle, means for exerting a torque tending to turn said wheel about its horizontal axis, and means rendered effective by the turning of the wheel upon its horizontal axis for exerting a torque tending to turn the wheel about its vertical axis for turning said wheel about its horizontal axis and returning the same to its normal plane of rotation.

4. In a gyroscope, the combination with a gyroscope-wheel, of means for supporting the same and permitting the wheel to turn about a horizontal and about a vertical axis, each of said axes being transverse to the axis of rotation of the wheel, means for exerting a torque tending to turn said wheel on said horizontal axis, and means rendered effective by the turning of the wheel on its horizontal axis for exerting a torque tending to turn the wheel on its vertical axis for turning said wheel on its horizontal axis and returning the same to its normal plane of rotation and thereby rendering the said vertical turning means ineffective.

5. In a gyroscope, the combination with a gyroscope-wheel and a spindle therefor, of means for supporting the spindle and permitting said spindle and wheel to turn about a horizontal and about a vertical axis, each of said axes being transverse to the axis of rotation of the wheel on its spindle, adjustable means for exerting a torque tending to turn said wheel about its horizontal axis, electromagnetic means for exerting a torque tending to turn the wheel about its vertical axis for turning said wheel about its horizontal axis and returning the same to its normal plane of rotation, circuit closers controlled by the wheel in turning on its horizontal axis; and means for maintaining the circuit closed until such return of the wheel to its normal plane of rotation.

6. In a gyroscope, the combination with a gyroscope-wheel, of means for supporting the same and permitting the wheel to turn about a horizontal and about a vertical axis, both of said axes being transverse to the axis of rotation of the wheel, an adjustable weight for exerting a torque tending to turn said wheel on said horizontal axis, a weight and means for supporting and guiding the same for automatically maintaining said torque upon said wheel responsive to the influence of the weight, and means rendered effective by the turning of the wheel on its horizontal axis for exerting a torque tending to turn the wheel on its vertical axis for turning said wheel on its horizontal axis and returning the same to its normal plane of rotation.

7. In a gyroscope, the combination with a gyroscope-wheel of means for supporting the same and permitting the wheel to turn about a horizontal and about a vertical axis, each of said axes being transverse to the axis of rotation of the wheel, adjustable means for continuously exerting a torque tending to turn said wheel on said horizontal axis, and means rendered effective by the actual turning of the wheel on its horizontal axis out of its normal plane of rotation for exerting a torque tending to return the wheel to its normal plane of rotation.

8. In a gyroscope, the combination with a gyroscope-wheel and a spindle therefor, of means for supporting the spindle and permitting the same and the wheel to turn about a horizontal and about a vertical axis, each of which axes being transverse to the axis of the rotation of the wheel upon its spindle, adjustable means for continuously exerting a torque tending to turn the wheel upon said horizontal axis, electro magnetic means for exerting a torque tending to turn the wheel about its vertical axis for turning the wheel about its horizontal axis and returning the same to its normal plane of rotation, a contact carried by each of the respective sides of said supporting means, coöperative circuit closing contacts, and means for advancing the latter toward the contact carried by the supporting means upon the closing of the circuit.

9. In a gyroscope, the combination with a gyroscope-wheel and a spindle therefor; of a frame carrying said spindle; a vertically disposed shaft, means for connecting the shaft to the frame and permitting movement of the wheel upon a horizontal axis transverse to its axis of rotation, an adjustable weight carried by one side of said frame, an upwardly curved tube carried by said side of the frame, ball weights in said tube, a ratchet wheel carried by said shaft, a pawl for engaging the same, a slide in the nature of an armature carrying said pawl and adapted to hold the same in an inoperative position, electro magnets for raising said slide and bringing the pawl into its operative position, an arm carried by each of the respective sides of said frame, contacts carried by said arms, coöperative circuit closer contacts each comprising a mercury cup in the form of a solenoid core, electro magnets for rocking said pawl, a solenoid having said circuit closer cup as a core, a source of electrical energy in circuit with the windings of said solenoid, said core, said slide actuating magnets and said arm, a pair of contacts, one of which is carried by said slide, and a source of electrical energy in circuit with said contacts and with the pawl rocking magnets.

10. In a gyroscope, the combination with a gyroscope-wheel, of means for supporting the same and permitting the wheel to turn about a horizontal and about a vertical axis, each of said axes being transverse to the axis of rotation of the wheel, and means rendered effective by the turning of the wheel on its horizontal axis for exerting a torque tending to turn the wheel on its vertical axis for turning said wheel on its horizontal axis and returning the same to its normal plane of rotation.

11. In a gyroscope, the combination with a gyroscope-wheel, of means for supporting the same and permitting the wheel to turn about a horizontal and about a vertical axis, both of said axes being transverse to the axis of rotation of the wheel, an adjustable weight for exerting a torque tending to turn said wheel on said horizontal axis, and a weight and means for supporting and guiding the same for automatically maintaining said torque upon said wheel responsive to the influence of the weight.

12. In a gyroscope, the combination with a gyroscope-wheel, of means for supporting the same and permitting the wheel to turn about a horizontal and about a vertical axis, both of said axes being transverse to the axis of rotation of the wheel, an adjustable weight carried at one side of said wheel, an upwardly curved tube carried at said side of the wheel and ball weights in said tube.

In witness whereof I have hereunto signed my name this 21st day of May, 1906, in the presence of two subscribing witnesses.

HERMANN ANSCHÜTZ-KAEMPFE.

Witnesses:
FRIEDRICH VON SCHIRACH,
JULIUS RÖPKE.